May 26, 1953  J. R. BRADFORD, JR  2,640,119
FLAT TIRE SIGNAL DEVICE
Filed Aug. 9, 1950  2 Sheets-Sheet 1
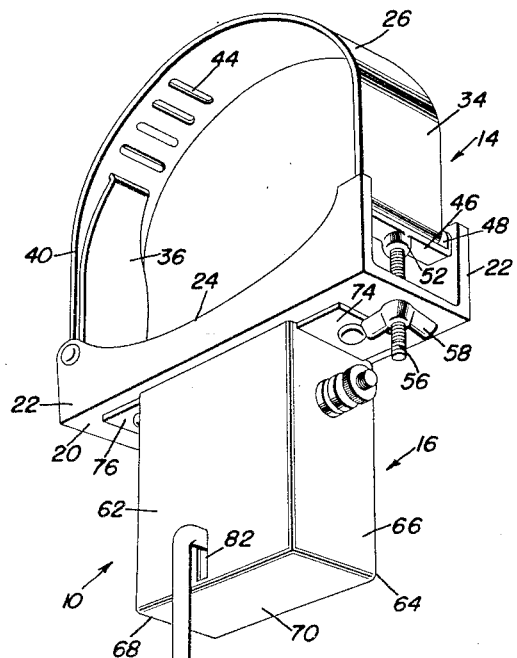
Fig. 1
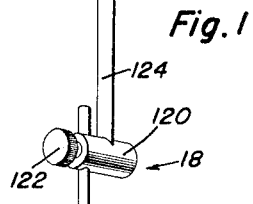
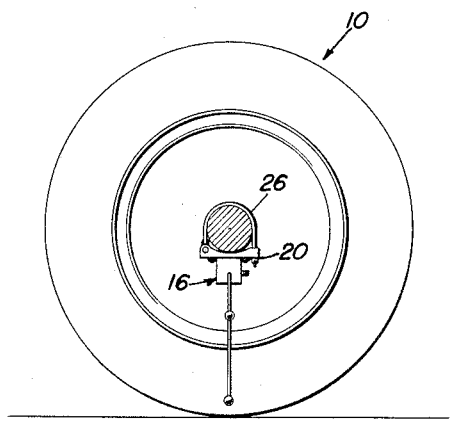
Fig. 4
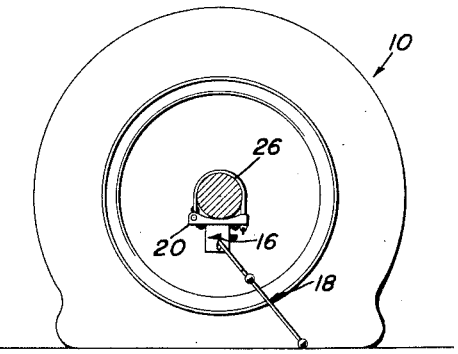
Fig. 5
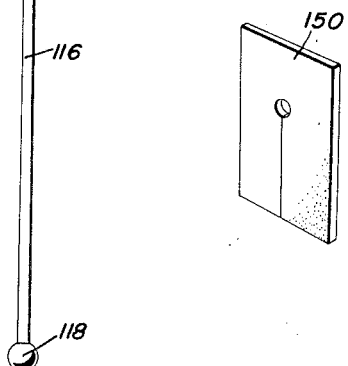
Fig. 7
John R. Bradford, Jr.
INVENTOR.
BY *Clarence A. O'Brien*
*and Harvey B. Jackson*
Attorneys May 26, 1953  J. R. BRADFORD, JR  2,640,119
FLAT TIRE SIGNAL DEVICE
Filed Aug. 9, 1950  2 Sheets-Sheet 2
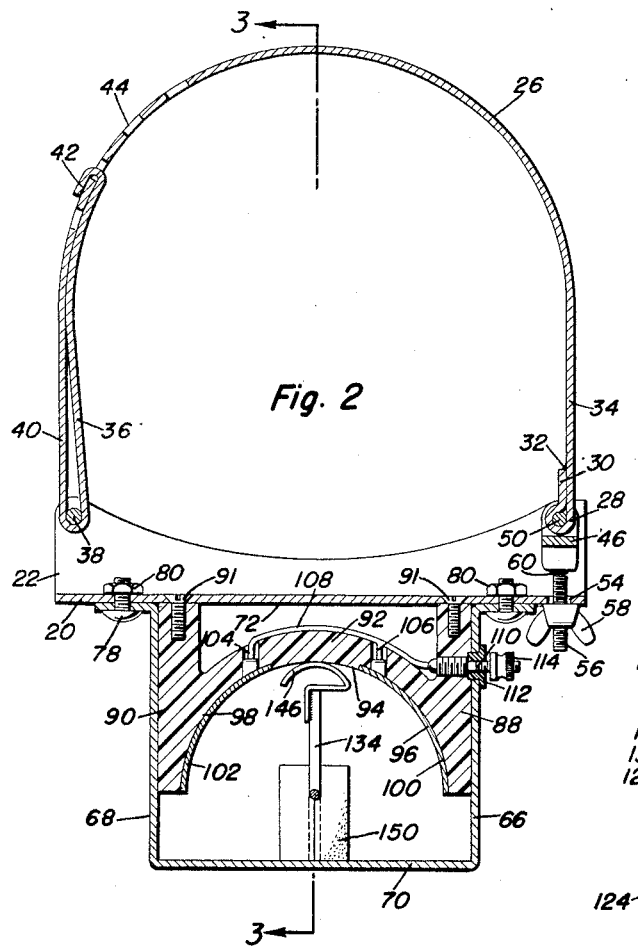
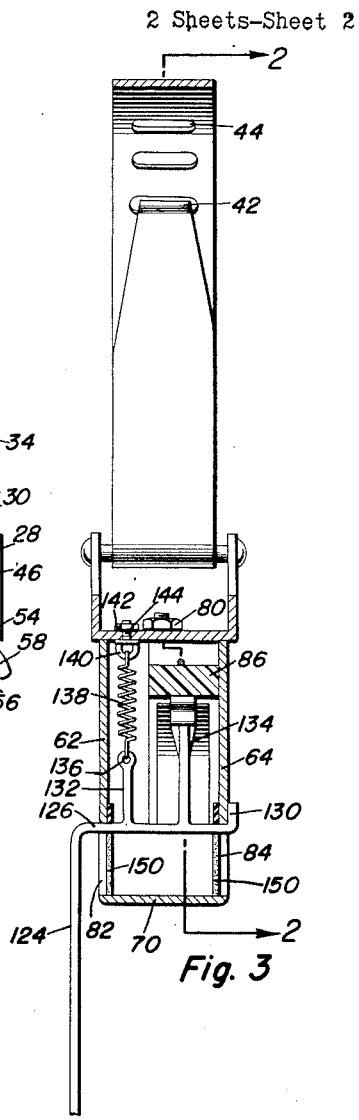
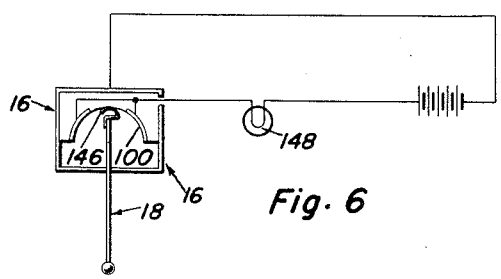
John R. Bradford, Jr.
INVENTOR.

Patented May 26, 1953

2,640,119

UNITED STATES PATENT OFFICE 2,640,119

FLAT TIRE SIGNAL DEVICE

John R. Bradford, Jr., Lordsburg, N. Mex.

Application August 9, 1950, Serial No. 178,486

2 Claims. (Cl. 200—58)

The present invention relates to improvements in tire deflation indicating devices, and more particularly to the type adapted to complete an electrical circuit for actuating a signalling device warning of a deflated tire.

An object of the present invention is to provide a device which is normally out of engagement with the ground but upon deflation of the vehicle tire, an element of the apparatus is adapted to contact the ground and be pivoted thereby, completing an electrical circuit whereby a signalling means is actuated.

A further object of the present invention is to provide a tire deflation indicating means which is normally resiliently held in operative position, and which will be actuated by a ground-contacting element which is adapted to pivot on contact with the ground, and wherein the electrical circuit will be completed regardless of which direction the ground-contacting element pivots with respect to the wheel axle.

This invention also has for its object to provide such means that positively provide a signal upon deflation of a tire, that are easily installed on a vehicle and easily disconnected therefrom, that are economical of manufacture and of general superiority.

The means by which the objects of the present invention are accomplished comprises a housing, a bracket for mounting the housing on the axle housing of a vehicle, a ground-contacting element pivotally and slidably mounted in the housing, resilient means for urging the ground-contacting element to a neutral position when the tire is inflated, the ground-contacting element being pivoted upon contact with the ground when the tire is deflated, contact means in the housing engageable by the ground-contacting element when in pivoted position for completing an electrical circuit and indicating a deflated tire.

Various other objects and advantages will be apparent from the detailed description to follow. In the description as well as in the claims, parts are at times identified by specific names for convenience, but such nomenclature is intended to be as generic in its application to analogous parts as the prior art will permit.

The best form in which I have contemplated applying my invention is illustrated in the accompanying drawings, wherein:

Figure 1 is an isometric view of the entire device of the present invention;

Figure 2 is a vertical sectional view taken substantially along the plane of line 2—2 of Figure 3;

Figure 3 is a vertical transverse sectional view taken substantially along the plane of line 3—3 of Figure 2;

Figure 4 is a side elevational view showing the present invention mounted on the axle of a vehicle with the tire inflated;

Figure 5 is a view similar to Figure 4 but wherein the tire is deflated and the ground-contacting element is pivoted;

Figure 6 shows the electrical signalling circuit employed in the present invention; and Figure 7 is a perspective view of the sealing element employed in conjunction with the slots in the housing.

Referring now more particularly to the drawings, wherein like numerals designate like parts throughout, the numeral 10 designates generally the wheel of a vehicle upon which a tire is mounted for which the tire deflation indicating device is provided. The numeral 12 designates generally the tire deflation indicating device of the present invention which includes a bracket mounting means 14, a switch housing 16 supported by the bracket 14, and a ground-contacting element 18 pivotally, slidably and resiliently supported by the switch housing 16.

The bracket 14 is formed from a channel iron member having a base 20 and side walls 22 integral with the base 20, each of the side walls 22 being provided with arcuately cut upper edges 24 for engagement with the axle housing of a vehicle. As seen best in Figure 2, a resilient U-shaped supporting element 26 is provided with an eyelet 28 at one end formed by the turned back portion 30 which is welded at 32 to the leg portion 34 of the U-shaped member 26. The other end of the U-shaped member 26 is doubled back at 36 about a pin 38 secured to the side walls 22 of the channel iron bracket 20, and is positioned in abutting relation to the leg portion 40 of the U-shaped member 26. The portion 36 of the U-shaped member 26 is provided with a bent end 42 for engagement in a preselected slot of the plurality of slots 44 provided in the axle housing engaging member 26.

As seen best in Figure 1, a bracket 46 having end flanges 48 is provided with a pin 50 which is rigidly supported by the flanges 48 and passes through the eyelet 28 of the supporting member 26. The bracket 46 is provided with a boss 52 having a recess therein. The bracket 20 is provided with an aperture at 54 through which extends a threaded lug 56 having a wing nut 58 threadably mounted thereon at the lower surface of the bottom wall 20, and the lug 56 is provided at its upper end with a ball 60 which is received in the recess of the boss 52 providing a substantially universal joint.

Since the U-shaped member 26 is pivotally mounted on the pin 50 and is substantially resilient, it will readily be seen that the channel-shaped member 20, 22 may be positioned adjacent the under side of an axle housing, and that the U-shaped member 26 may be pivoted over the upper portion of the axle housing and the end 36 may be passed about the pin 38 and the bent end 42 may then be inserted in an appropriate slot 44. The final tightening adjustment may then be accomplished by means of the wing nut 58 on the lug 56.

The switch housing 16 is formed from front and back walls 62 and 64, side walls 66 and 68, bottom wall 70 and open upper end 72. Each of the end walls 66 and 68 is provided with a flange 74 or 76 which is bolted to the base 20 of the channel-shaped member by means of bolts and nuts 78 and 80. The front wall 62 is provided with a vertically extending slot 82 and the back wall 64 is provided with a vertically extending slot 84. An insulating element 150 provided with a longitudinal slit is secured to the inner surface of the housing adjacent the slots 82 and 84 whereby weather proofing of the housing may be accomplished.

The interior of the switch housing 16 is best shown in Figures 2 and 3. An insulating member 86 having side wall engaging portions 88 and 90 is provided with an arcuate portion 92 integral with the side wall engaging portions 88 and 90. The insulating element 86 is positioned for engagement with each of the side walls and the back wall 64.

The inner face of the arcuate portion 92 of the insulating member 86 is provided with arcuate recesses 96 and 98 in which are secured electrical contact members 100 and 102. Each of the arcuate contact members 100 and 102 is provided with an electrical connector 106 or 108 which are connected together by means of the conductor 108 which is, in turn, connected to the terminal 110 which is threadably mounted in the side engaging portion 88 of the insulating element. The terminal 110 is provided with an insulating bushing 112 to prevent electrical contact with the side wall 66. The terminal 110 is provided with a terminal nut 114 which is threadably mounted thereon.

The ground-contacting element 18 is formed with a ground-contacting rod 116 having a ground-contacting button 118 at its lower end. The rod 116 is adjustably secured in a bore in the adjusting element 120 by means of the screw 122. The adjusting element 120 is fixedly secured to the angulated rod 124 which has its angulated end 126 extending through the slots 82 and 84. The end 130 of the angulated member 124 is in electrical contact with the back wall 64 of the switch housing. The angulated portion 126 is provided with two upstanding rods 132 and 134. The rod 132 is provided with an eyelet 136 at its upper end in which one end of a spring is held. The other end of the spring 138 is retained in the eyelet 140 which is held in supported position by means of the bottom wall 20 of the channel iron member by means of the nut 142 threadably mounted on the shank 144.

The second rod 134 is provided at its upper end with an arcuately bent and angulated spring contact member 146 which is adapted to ride in engagement with the arcuate wall formed by the arcuate portion 92 of the insulating member and the arcuate contact members 100 and 102.

It is believed that from the foregoing description taken in conjunction with the drawings the operation of the present device will be readily apparent to one skilled in the art. As seen in Figures 4 and 5, when the vehicle tire becomes deflated, the ground-contacting element 18 engages the ground and is pivoted thereby with respect to the switch housing 16. Pivoting of the ground-engaging element causes the spring contact element 146 to engage either one of the arcuate contact members 100 or 102. As seen in the illustration of the electrical circuit in Figure 6, the switch housing 16 is connected to the negative side of the battery and is in electrical contact with the ground-engaging element. The lamp 148 is connected by wires to ground and to the arcuate contact elements 100 and 102. When the ground-contacting element is pivoted upon contact with the ground, the contact element 146 will engage one of the members 100 or 102, completing the circuit for the lamp 148, thereby signalling that one of the tires is deflated.

From the foregoing, it is believed that a device has been provided which will accomplish all of the objects hereinabove set forth.

Having described the invention, what is claimed as new is:

1. A tire deflation indicating device comprising a housing adapted to be mounted on the axle housing of a vehicle, a ground-contacting element pivotally and slidably mounted in said housing, said ground-contacting element being pivoted upon contact with the ground when the tire is deflated, contact means in said housing engageable by said ground-contacting element when in pivoted position for completing an electrical circuit and indicating a deflated tire, said ground-contacting element including an angulated member having its angulated portion received in slots in the walls of said housing, a spring contact element fixed to the upper end of an upstanding rod on said angulated portion and adapted to be in engagement with said contact means when the tire is deflated, and resilient means for normally urging said ground-contacting element to a neutral position when the tire is inflated.

2. A switch mechanism comprising a grounded housing adapted to form a part of an electrical circuit, a pair of spaced arcuate contacts mounted within said housing and insulated from same, said contacts lying along a common arc, wiring connecting said contacts to a common terminal, an actuating rod carried by said housing for sliding and pivotal movement in a vertical slot in said housing, a spring contact mounted on said rod for contacting one of said arcuate contacts upon pivoting of said rod, spring means carried by said housing urging said rod upwardly in said slot to have its contacts normally resiliently engage insulation extending between opposed ends of said spaced arcuate contacts.

JOHN R. BRADFORD, Jr.

References Cited in the file of this patent

UNITED STATES PATENTS

| Number | Name | Date |
|---|---|---|
| 2,457,161 | Laidlaw | Dec. 28, 1948 |

FOREIGN PATENTS

| Number | Country | Date |
|---|---|---|
| 714,697 | France | Sept. 8, 1931 |
| 748,796 | France | Apr. 25, 1933 |
| 791,580 | France | Sept. 30, 1935 |